United States Patent
Braun et al.

(10) Patent No.: US 8,241,693 B2
(45) Date of Patent: Aug. 14, 2012

(54) METHOD OF PRODUCING A FAT COMPOSITION

(75) Inventors: Peter Braun, Kreuzlingen (CH); Bernd Schmidt, Kirchberg (CH); Andreas Ziegler, Niederuzwil (CH); Erich Staubli, Flawil (CH)

(73) Assignee: Bühler AG, Uzwil (CH)

( * ) Notice: Subject to any disclaimer, the term of this patent is extended or adjusted under 35 U.S.C. 154(b) by 321 days.

(21) Appl. No.: 12/666,230

(22) PCT Filed: May 5, 2008

(86) PCT No.: PCT/CH2008/000202
§ 371 (c)(1),
(2), (4) Date: Dec. 22, 2009

(87) PCT Pub. No.: WO2009/000093
PCT Pub. Date: Dec. 31, 2008

(65) Prior Publication Data
US 2010/0183795 A1 Jul. 22, 2010

(30) Foreign Application Priority Data
Jun. 22, 2007 (DE) .................. 10 2007 029 221

(51) Int. Cl.
*A23G 3/32* (2006.01)

(52) U.S. Cl. ........ 426/602; 426/613; 426/605; 426/660; 426/523

(58) Field of Classification Search .......... 426/602–605, 426/631, 660, 613, 523
See application file for complete search history.

(56) References Cited

U.S. PATENT DOCUMENTS

| | | | |
|---|---|---|---|
| 2006/0121175 A1* | 6/2006 | Hanselmann | 426/631 |
| 2006/0286272 A1* | 12/2006 | Hanselmann | 426/631 |
| 2008/0248176 A1* | 10/2008 | Brown | 426/534 |
| 2008/0248183 A1* | 10/2008 | Brown | 426/588 |

FOREIGN PATENT DOCUMENTS

| | | |
|---|---|---|
| EP | 0033718 | 8/1981 |
| EP | 0393327 | 10/1990 |
| EP | 0500182 | 8/1992 |
| EP | 0832567 | 4/1998 |
| EP | 1673977 | 6/2006 |
| JP | 60027339 | 2/1985 |
| JP | 05064545 | 3/1993 |
| JP | 06030699 | 2/1994 |
| NL | 8004633 | 3/1982 |
| WO | 93/12664 | 7/1993 |
| WO | 00/32057 | 6/2000 |
| WO | 2004/112491 | 12/2004 |

OTHER PUBLICATIONS

Chenoweth, W. 1936. How to Make Candy. The MacMillan Company, New York. p. 94-97, 100, 156-159, 165-166.*

* cited by examiner

*Primary Examiner* — Carolyn Paden
(74) *Attorney, Agent, or Firm* — Shoemaker and Mattare

(57) ABSTRACT

The invention relates to a method of producing a fat-containing suspension and/or a fat-containing emulsion, in particular a chocolate or a chocolate-like fat composition, by mixing an emulsion formed by means of a reactive emulsifying technique, which emulsion has a disperse aqueous phase and a continuous fat phase, with a fat phase, in particular a cocoa mass. The invention relates, in particular, to a method of producing agave syrup-containing chocolate, wherein an emulsion consisting of cocoa butter or another fat or fat mixture and agave syrup or an aqueous sugar solution is generated and mixed with cocoa mass. According to the invention, the emulsion and later the chocolate are stabilized by emulsification at elevated temperature and evaporating the agave syrup or the sugar solution in the emulsified state. An otherwise customary comminution of the dry materials is therefore no longer necessary since the fineness necessary for sensory properties is set by the emulsifying process.

17 Claims, 1 Drawing Sheet

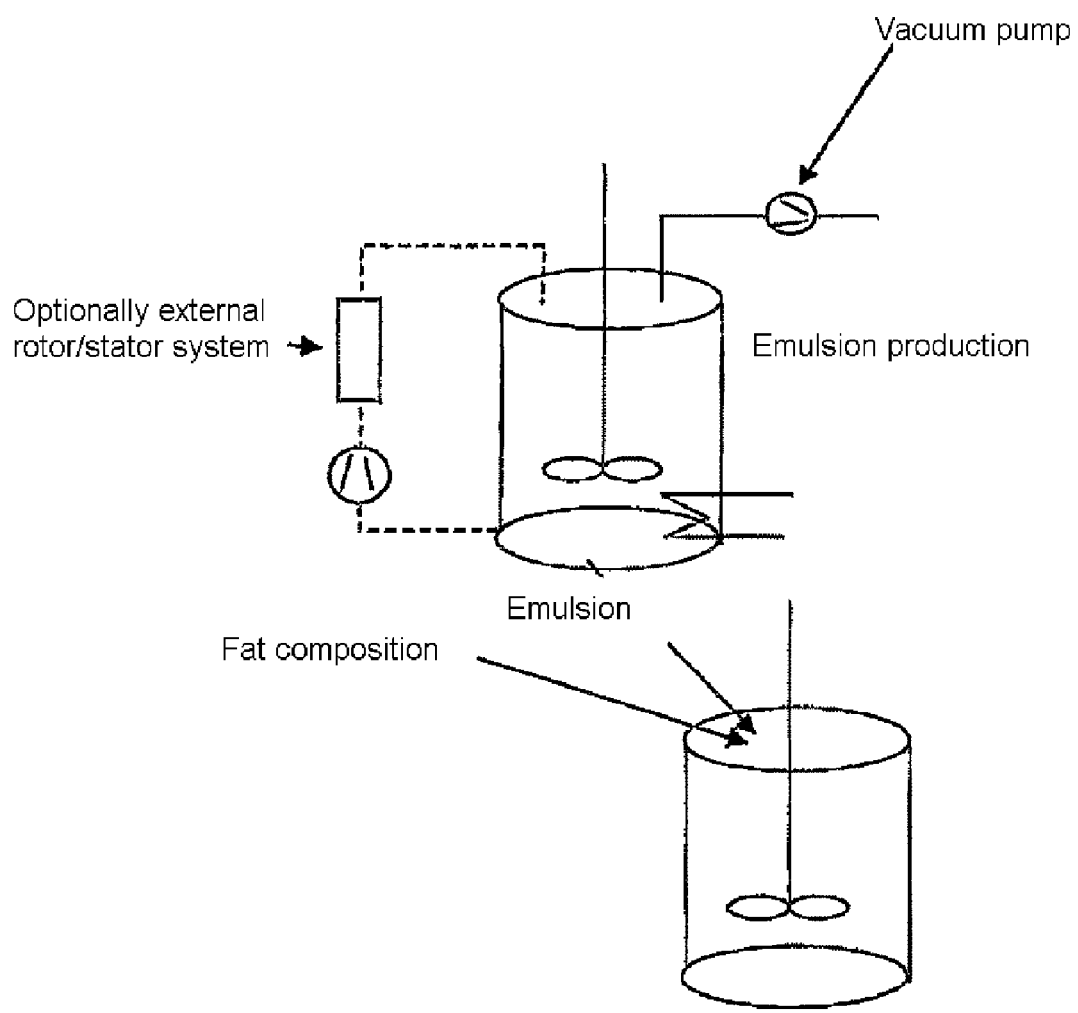

METHOD OF PRODUCING A FAT COMPOSITION

The invention relates to a method of producing a fat-containing suspension or a fat-containing emulsion, in particular a chocolate or a chocolate-like fat composition.

BACKGROUND OF THE INVENTION

In the production of water-containing chocolates, to date, problems always arise in the dissolution of the sugar or the milk powder. This leads to postthickening of the chocolate or low storage stability.

Agave syrup is a concentrated sugar solution predominantly consisting of fructose and oligomers thereof. Agave syrup is obtained organically and is suitable for the production of organic chocolates.

BRIEF SUMMARY OF THE INVENTION

The object of the invention is to produce a chocolate or a chocolate-like product consisting of agave syrup and/or another polysaccharide-containing aqueous solution and cocoa mass and also possibly milk powder.

According to the invention this object is achieved by a method of producing a fat-containing suspension or a fat-containing emulsion, in particular a chocolate or a chocolate-like fat composition by mixing an emulsion formed using a reactive emulsifying technique, which emulsion comprises a disperse aqueous phase and a continuous fat phase, with a fat phase, in particular a cocoa mass.

"Fat-containing suspension" or "fat-containing emulsion" here designates the composition after the mixing operation, that is to say the "dispersion" of more or less solid particles in a continuous fat phase. The discontinuous phase can a) comprise only liquid particles such as, e.g. water droplets containing a dissolved polysaccharide, or b) it can comprise liquid and solid particles, such as e.g., water droplets containing a dissolved polysaccharide, solid particles of cocoa and/or polysaccharide, or it can comprise only solid particles, such as, e.g., highly concentrated and therefore highly viscous droplets of polysaccharide solution which are here described as a "semisolid state".

The invention relates in particular to a method of producing agave-syrup-containing chocolate, wherein an emulsion consisting of cocoa butter or another fat or fat mixture and agave syrup or an aqueous sugar solution is generated and mixed with cocoa mass. According to the invention the emulsion, and later the chocolate, are stabilized by emulsification at elevated temperature and evaporating the agave syrup or the sugar solution in the emulsified state. An otherwise conventional comminution of the dry materials is therefore no longer required, since the fineness which is necessary for sensory properties is established by the emulsification process.

The invention also delivers a method of producing an emulsion which comprises a disperse aqueous phase and a continuous fat phase, wherein the emulsion is formed at elevated temperatures for the purpose of adjusting the viscosity ratios of disperse phase to continuous phase in the range 30 to 120° C., preferably 50 to 80° C.

The invention additionally delivers a method of producing an emulsion which comprises a disperse aqueous phase and a continuous fat phase using a reactive emulsifying technique, wherein, in the course of the emulsification or subsequently, the dry matter content of the disperse phase is increased by evaporation under atmospheric or reduced pressure conditions in the range 0.1 to 1 bar.

DESCRIPTION OF THE DRAWINGS

FIG. 1 shows the process of producing a fat-containing suspension.

DETAILED DESCRIPTION OF THE INVENTION

The invention provides that highly concentrated sugar solutions are emulsified in cocoa butter and/or in another fat at elevated temperatures and are treated in such a manner that the disperse sugar phase of the emulsion is present in the supersaturated state at room temperature and the droplets are therefore present in the solid to semisolid state.

This emulsion thus stabilized is subsequently mixed with a cocoa mass which is pretreated as desired and ground to the final fineness and thus the finished chocolate is generated.

Preferably, emulsifiers such as PGPR, SPAN, TWEN are used in the range from 0.2 to 10% by weight, based on the emulsion.

Preferably, the fat-containing suspension or fat-containing emulsion is formed by mixing a fat phase with one or more emulsions.

Preferably, milk powder and/or proteins and/or mono- and/or di- and/or polysaccharides and/or hydrocolloids are dissolved in the disperse aqueous phase of the emulsion.

In a particularly preferred embodiment, agave syrup is used as disperse phase.

Preferably, targeted caramelization is performed during the method.

Preferably, emulsifier is added to the emulsion, to the emulsions and/or to the fat composition, before mixing.

Preferably, the fat is separated off from the fat-containing phase, e.g. cocoa mass, by centrifugation and/or filtration before the mixing with the emulsion. This fat which is separated off can be used for producing the emulsion and thereby the total fat content of the finished product can be reduced.

Preferably, the emulsion or the emulsions are produced continuously and/or batchwise.

Preferably, the emulsifying appliance (rotor/stator system) is situated, in the case of batchwise operation, in the tank or outside the tank, and the emulsion can flow through these once or several times and is recirculated to the tank.

For the production of this emulsion it is necessary that the disperse phase, here the aqueous solution, and continuous phase, here the molten fat phase, exhibit viscosity ratios up to 5:1. By emulsifying in the temperature range between 30° and 120° C., the viscosity of the disperse phase can be reduced correspondingly far. The use of emulsifiers, for example PGPR or TWEN or SPAN supports emulsion formation. Emulsification is performed in commercially conventional rotor/stator systems. Subsequently to, or in parallel to, the emulsification, the disperse phase is evaporated. The evaporation can proceed under vacuum or at atmospheric pressure. The disperse phase is evaporated to water contents of 0 to 40% and the supersaturation is thus achieved. In support, acid can be added in order to induce further water reduction by hydrolysis of the sugar. This is therefore a reactive emulsifying process.

In extension, the aqueous phase can further be enriched or formed with protein and/or mono-, di- and poly-saccharides and/or milk powder and/or hydrocolloids. Formation of multiple emulsions or a mixture with one and/or more emulsions is likewise possible.

The emulsion thus stabilized is then mixed with the cocoa mass and/or another fat composition.

A comminution of the dry materials is therefore no longer necessary, since the fineness which is necessary for sensory properties is established by the emulsification process.

For good crystallization of the mixture it is necessary to precrystallize it. For this purpose either the emulsion and/or the cocoa mass and/or fat composition can be precrystallized before the mixing. It is likewise possible also to perform the precrystallization in the mixed state by addition of crystal nuclei.

The method described above may include an initial step of separating fat from the fat-containing phase, e.g. a cocoa mass. This can be done in various ways, e.g., by centrifugation and/or filtration. The fat which is separated off may be used in whole or in part for producing the emulsion.

Additionally, the mixture may be separated by removing the water-containing phase by centrifuging and/or filtration.

The separation may be performed following an addition of water.

Additionally, a fat phase which is reduced in fat content, e.g. partially defatted cocoa mass, may be mixed with the emulsion.

The fat phase and/or the emulsion phase may also be precrystallized before the mixing, for example by adding crystallization nuclei before the mixing.

The invention claimed is:

1. A method of producing a fat-containing suspension or a fat-containing emulsion, said method comprising the following steps:

forming an emulsion comprising a disperse aqueous phase and a continuous fat phase using a reactive emulsifying technique, wherein the emulsion comprising a disperse aqueous phase and a continuous fat phase is formed at elevated temperatures for the purpose of adjusting the viscosity ratio of the disperse phase to the continuous phase to within the range of 30° C. to 120° C. wherein the viscosity of the disperse phase is reduced so that the disperse aqueous phase and the continuous fat phase exhibit viscosity ratios up to 5:1 and wherein, during or after the step of forming an emulsion, the disperse aqueous phase is evaporated to water content of 0% to 40%, wherein the dry matter content of the disperse phase is increased by evaporation under atmospheric or reduced pressure conditions in the range of 0.1 bar to 1 bar, and thus supersaturation is achieved; and then mixing the emulsion with a fat phase.

2. The method as claimed in claim 1, further comprising a step of using emulsifiers in the range from 0.2% to 10% by weight, based on the emulsion.

3. The method as claimed in claim 2, wherein the emulsifiers are selected from the group consisting of polyglycerol polyricinolate (PGPR) and monostearate sorbitans (SPAN).

4. The method as claimed in claim 1, wherein the fat-containing suspension or fat-containing emulsion is formed by mixing a fat phase with one or more emulsions.

5. The method as claimed in claim 1, wherein at least one substance selected from the group consisting of milk powder, proteins, mono-saccharides, disaccharides, polysaccharides and hydrocolloids is dissolved in the disperse aqueous phase of the emulsion.

6. The method as claimed in claim 1, wherein agave syrup is used as disperse phase.

7. The method as claimed in claim 1, wherein the disperse aqueous phase is an aqueous sugar solution and targeted caramelization of the disperse phase is performed.

8. The method as claimed in claim 1, wherein an emulsifier is added to the emulsions and/or to the fat composition, before mixing.

9. The method as claimed in claim 1, comprising a further step of separating off fat from the fat-containing phase.

10. The method as claimed in claim 9, wherein the mixture is separated by separation of the water-containing phase by centrifugation or filtration.

11. The method as claimed in claim 9, wherein the fat is separated off from the fat-containing phase by centrifugation or filtration.

12. The method as claimed in claim 11, wherein the separation is performed by prior addition of water.

13. The method as claimed in claim 1, wherein the fat which is separated off is used in whole or in part for producing the emulsion.

14. The method as claimed in claim 1, wherein a fat phase which is reduced in fat content is mixed with the emulsion.

15. The method as claimed in claim 1, wherein the fat phase or the emulsion phase is precrystallized before the mixing.

16. The method as claimed in claim 1, wherein the fat phase or the emulsion phase is precrystallized by adding crystallization nuclei before the mixing.

17. The method as claimed in claim 1, wherein the disperse aqueous phase is an aqueous sugar solution, the continuous phase is a cocoa butter and the fat phase is a cocoa mass.

* * * * *